Oct. 23, 1951     F. M. POOLE ET AL     2,572,515
METHOD OF IMPREGNATING ELECTRICAL MOTOR ARMATURES
Filed June 20, 1946     3 Sheets-Sheet 1

INVENTORS
FOY M. POOLE
JOHN J. FOYE JR.
BY
A. T. Sperry
ATTORNEY

Oct. 23, 1951  F. M. POOLE ET AL  2,572,515
METHOD OF IMPREGNATING ELECTRICAL MOTOR ARMATURES
Filed June 20, 1946  3 Sheets-Sheet 2

INVENTORS
FOY M. POOLE
JOHN J. FOYE JR.
BY
R. T. Sperry
ATTORNEY

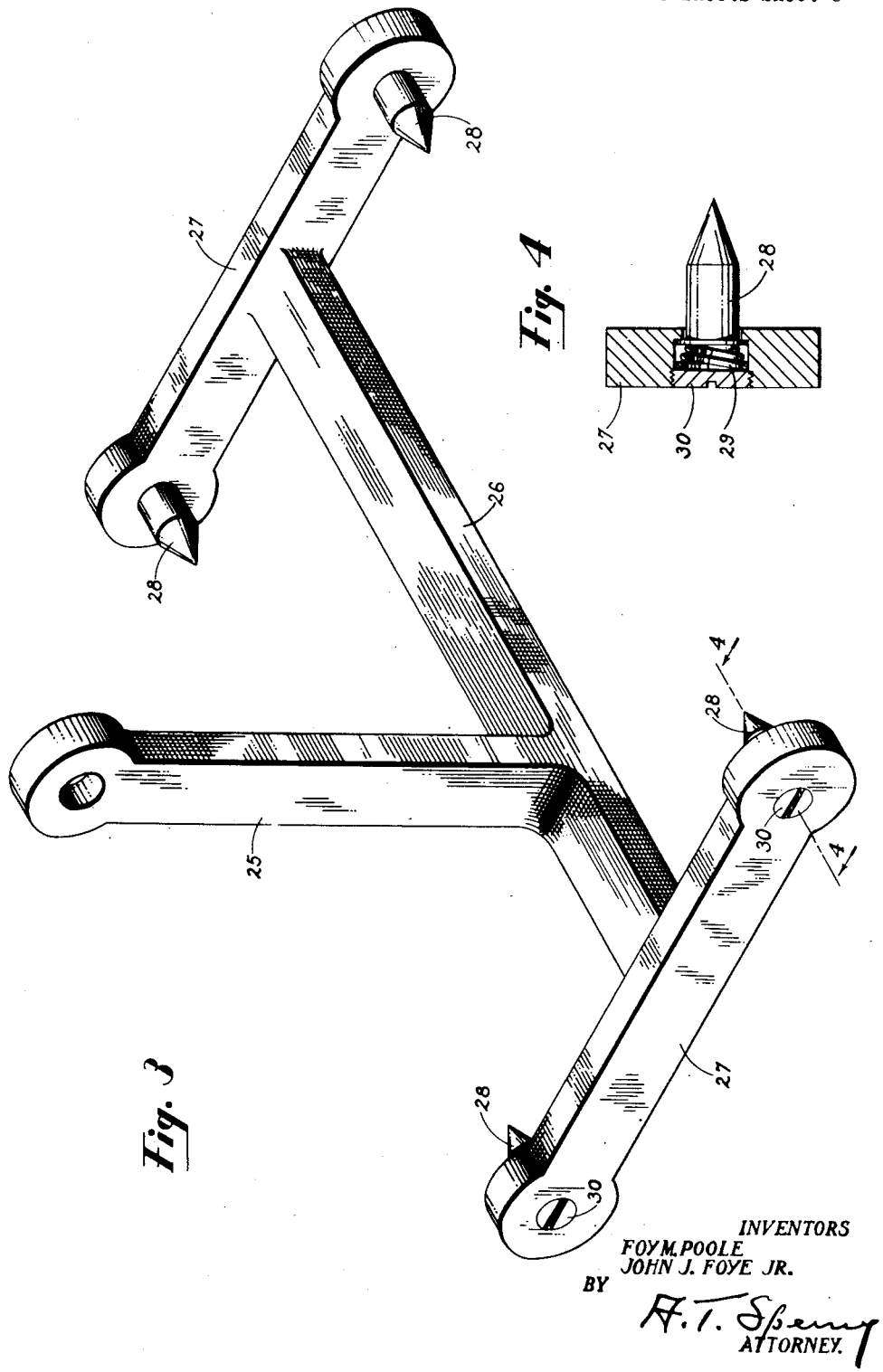

Patented Oct. 23, 1951

2,572,515

UNITED STATES PATENT OFFICE 2,572,515

METHOD OF IMPREGNATING ELECTRICAL MOTOR ARMATURES

Foy M. Poole, Stamford, and John J. Foye, Jr., Old Greenwich, Conn., assignors to Electrolux Corporation, Old Greenwich, Conn., a corporation of Delaware Application June 20, 1946, Serial No. 678,151

4 Claims. (Cl. 117—43)

1

This invention relates to manufacturing methods and apparatus and is particularly concerned with such methods and apparatus involving the application of liquids to objects.

While the present inventive concept may be variously applied in widely differeing manufacturing operations, it is here disclosed in connection with the application of bonding and insulating lacquer to electric motor armatures, this being one application of the invention which has been commercially successful.

Previous methods and apparatus for the application of liquids have for the most part involved spraying and dipping operations which have been uneconomical with respect to the quantity of liquid used and have involved handling problems which were uneconomical, both with regard to the cost of apparatus employed and time and labor consumed.

It is an object of the present invention to provide a method which is novel, simple and economical, while insuring an effective and efficient application of the liquid to the workpiece involved.

Another and equally important object of the invention is to provide a novel, simple and economical apparatus for carrying out the above method.

More specifically it is an object of the present invention to economically and efficiently apply a controlled quantity of insulating, bonding and sealing lacquer to electric motor armatures or the like.

A corollary object is to provide an apparatus for effectively and efficiently applying the controlled quantity of lacquer to motor armatures or the like.

A further and more specific object of the invention is to provide a method of and apparatus for treating manufactured parts, such as motor armatures by a continuous operation by means of which the parts are preheated, a controlled quantity of liquid is applied and they are subsequently baked and if desired, such operations are repeated without removal of the parts from their continuously moving carrier.

Numerous other objects and features of the present invention will be apparent from a consideration of the following specification and the accompanying drawings, in which;

2

Fig. 3 is a perspective view of the armature carrying fixture shown in Figs. 1 and 2; and Fig. 4 is a detailed sectional view taken on lines of 4—4 of Fig. 3.

Figure 1:
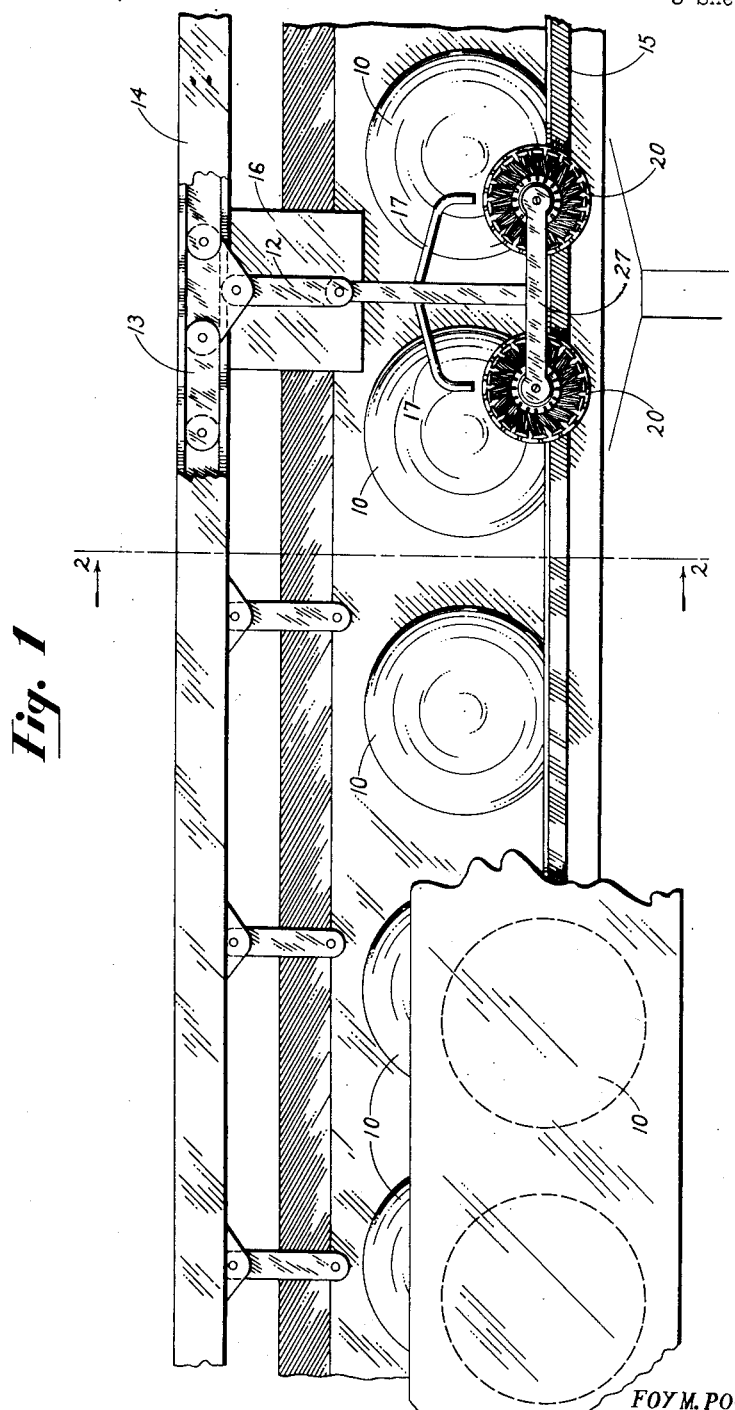
Fig. 1 is a fragmentary view of the apparatus of the present invention by which the method of the present invention may be carried out.
Figure 2:
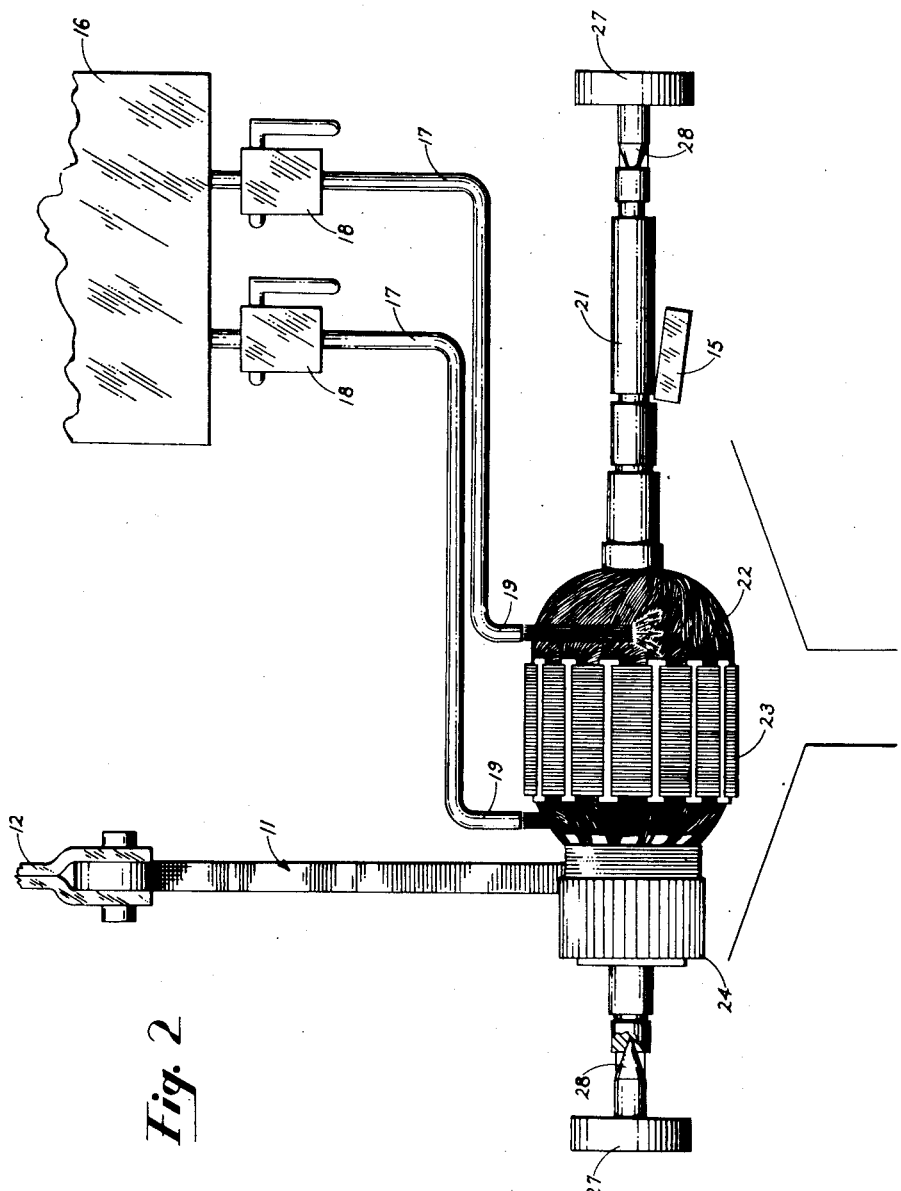
Fig. 2 is a vertical sectional view taken on the lines of 2—2 of Fig. 1.

In general terms, the method of the present invention provides for the steps of preheating the workpiece and flowing upon selected portions thereof a liquid, while the workpiece is rotated, and thereafter baking the workpiece, these operations being carried out during a continuous movement of the workpiece by conveyer mechanism.

The apparatus of the present invention includes batteries of heating elements, preferably of the infrared type, together with conveying means which carries the workpiece past the heating elements while rotating the same, together with liquid tanks and discharge spouts therefor under which the workpiece is passed to apply the liquid thereto.

Referring more specifically to the drawings, banks of heating elements comprising infrared lamps 10 are positioned on either side of the path of travel of fixtures 11 which are supported from depending links 12 of a conveyer chain 13 which is mounted for travel within a protecting and guiding member 14. Parallel with the member 14 and positioned adjacent to path of travel of the workpieces, there is provided a track 15 with which the workpieces contact during the travel and by virtue of which contact they are caused to rotate in their fixtures.

For applying the liquid to the workpieces, there is provided a liquid tank 16 from which depend a pair of flow tubes 17, each of which is controlled by a valve 18. The discharge ends 19 of the conduits or tubes 17 are transversely spaced between the heating elements and are also preferably longitudinally spaced with respect to the path of travel of the workpiece, the arrangement being such that as workpieces are carried along by the fixture, they pass between the heating elements to preheat the workpieces. Thereafter they pass under the spaced flow tubes whereby liquid is applied at spaced points on each workpiece, while they are rotated by frictional engagement with the track 15, thereby evenly distributing the liquid on the selected areas thereof. Thereafter the continued travel of the workpiece between the heating elements causes the liquid to be baked and thus hardened. If desired, plural liquid depositing stations may be arranged so that successive coatings may be applied and baked.

In that form of the invention here specifically illustrated, the workpieces indicated by the numeral 20 are electric motor armatures, each comprising a central shaft 21 having an iron core made up of slotted laminations 23 mounted on the shaft, within the slots of which are wound coils 22. A commutator 24 is conventionally applied at one end of the shaft 21. In completing the manufacturing steps of such armatures, it is required that the coils be impregnated with a lacquer which insulates, seals and bonds the coils in position. Prior practices have involved the preheating and immersion of the armatures in the lacquer and subsequent baking. Such practices not only involve complicated handling problems and waste of lacquer by "drag out," but also require subsequent removal of the lacquer from the shaft and commutator, as well from the exposed edges of the laminations. With the present process, the preheating, liquid applying and baking are accomplished in a continuous operation without multiple handling of the armatures and with minimum use of the lacquer.

Referring to Figs. 3 and 4, there is presented a preferred form of fixture specifically designed for the use with motor armatures. The link 12 of the chain 13 is pivotally connected to a vertical arm 25 of the fixture which has integrally formed thereon a transverse beam 26, the ends of which are provided with carrier bars 27. The extremities of the bars 27 carry pointed dowels 28 which engage recesses in the ends of the armature shafts 21 so as to support the armature while permitting free rotation thereof. As illustrated in Fig. 4, the dowels 28 in the arm 27 to the left of Fig. 3 are normally thrust inwardly by springs 29 secured within recesses in the ends of the arm 27 by screw plugs 30, thus permitting the dowels to be moved outwardly to permit insertion and removal of the armatures. From this structure, it will be seen that the armatures are carried in pairs by the fixtures and in such manner as to cause the armatures to engage the track 15 so as to be continuously rotated as they are conveyed by the chain 13 past the heating elements and liquid spouts 19.

In the operation of the present invention in the manufacture of motor armatures, the preheating of the armatures as they pass the infrared lamps mounted in advance of the tank drives out moisture from the interstices formed by the windings and, through a phenomena not altogether understood, when lacquer strikes the coil, the requisite amount is drawn inwardly so as to efficiently and effectively impregnate, bond and seal the windings whereby, upon baking of the lacquer in the further passage of the armatures by the infrared lamps, there is formed a hard solid and secure incasement of the coils. By virtue of the phenomena mentioned, the requisite amount only, may be applied and hence there is a minimum of dripping of lacquer from the armature and a minimum of spreading of the lacquer to the armature shaft, laminations or commutator, and hence the use of lacquer is economical and subsequent operations to remove lacquer from points beyond the coils are eliminated.

It will be understood that the present invention is widely applicable to manufacturing operations other than motor armatures and it will be further understood that the invention is not limited to the specific steps of the specific apparatus here presented as illustrative. Numerous changes and modifications of the method steps and of the apparatus may be resorted to without departure from the spirit or scope of the present invention which is outlined in the appended claims.

What we claim is:

1. The method of coating and impregnating an electrical motor armature having wound coils portions of which are disposed in slots while the end portions are exposed comprising the steps of preheating the armature, positioning the axis of the armature in a substantially horizontal plane, rotating the heated armature about its axis, transversely moving the heated armature across the path of a pair of spaced streams of coating liquid, directing said spaced streams of liquid onto said exposed end portions of the coils of said armature whereby the coating spreads in opposite directions to impregnate and coat the coils, and further heating the armature while rotating the same to set the coating on the windings.

2. The method of coating and impregnating an electrical motor armature having wound coils portions of which are disposed in slots while the end portions are exposed comprising the steps of preheating the armature, positioning the axis of the armature in a substantially horizontal plane, rotating the heated armature about its axis, transversely moving the rotating heated armature across the path of a pair of spaced downwardly flowing streams of coating liquid, directing said downwardly flowing streams of liquid onto said exposed end portions of the coils of said armature, whereby the coating spreads in opposite directions to impregnate and coat the coils, and further heating the armature while rotating the same to set the coating on the windings.

3. The method of coating and impregnating an electrical motor armature having wound coils portions of which are disposed in slots while the end portions are exposed comprising the steps of preheating the armature, positioning the axis of the armature in a substantially horizontal plane, rotating the heated armature about the axis, transversely moving the rotating heated armature in a horizontal direction across the path of a pair of spaced downwardly directed vertical streams of coating liquid, directing said spaced downwardly directed vertical streams of liquid onto said exposed end portions of the coils of said armature, whereby the coating spreads in opposite directions to impregnate and coat the coils, and further heating the armature while rotating the same to set the coating on the windings.

4. The method of coating and impregnating an electrical motor armature having wound coils portions of which are disposed in slots while the end portions are exposed comprising the steps of preheating the armature while rotating the same, positioning the axis of the armature in a substantially horizontal plane, rotating the heated armature about its axis, transversely moving the rotating heated armature across the path of a pair of spaced streams of coating liquid, directing said spaced streams of liquid onto said exposed end portions of the coils of said armature, whereby the coating spreads in opposite directions to impregnate and coat the coils, and further heating the armature while rotating the same to set the coating on the windings.

FOY M. POOLE.
     JOHN J. FOYE, Jr.

REFERENCES CITED

The following references are of record in the file of this patent:

UNITED STATES PATENTS

| Number | Name | Date |
|---|---|---|
| 1,111,443 | Dunton | Sept. 22, 1914 |
| 1,362,215 | Appelt | Dec. 14, 1920 |
| 1,928,938 | Johnson | Oct. 3, 1933 |
| 2,116,318 | Miles | May 3, 1938 |
| 2,274,610 | Goodwin | Feb. 24, 1942 |
| 2,288,585 | Partee | June 30, 1942 |
| 2,364,986 | Law | Dec. 12, 1944 |
| 2,411,180 | Alexander | Nov. 19, 1946 |
| 2,416,249 | Belada | Feb. 18, 1947 |